United States Patent Office 3,348,917
Patented Oct. 24, 1967

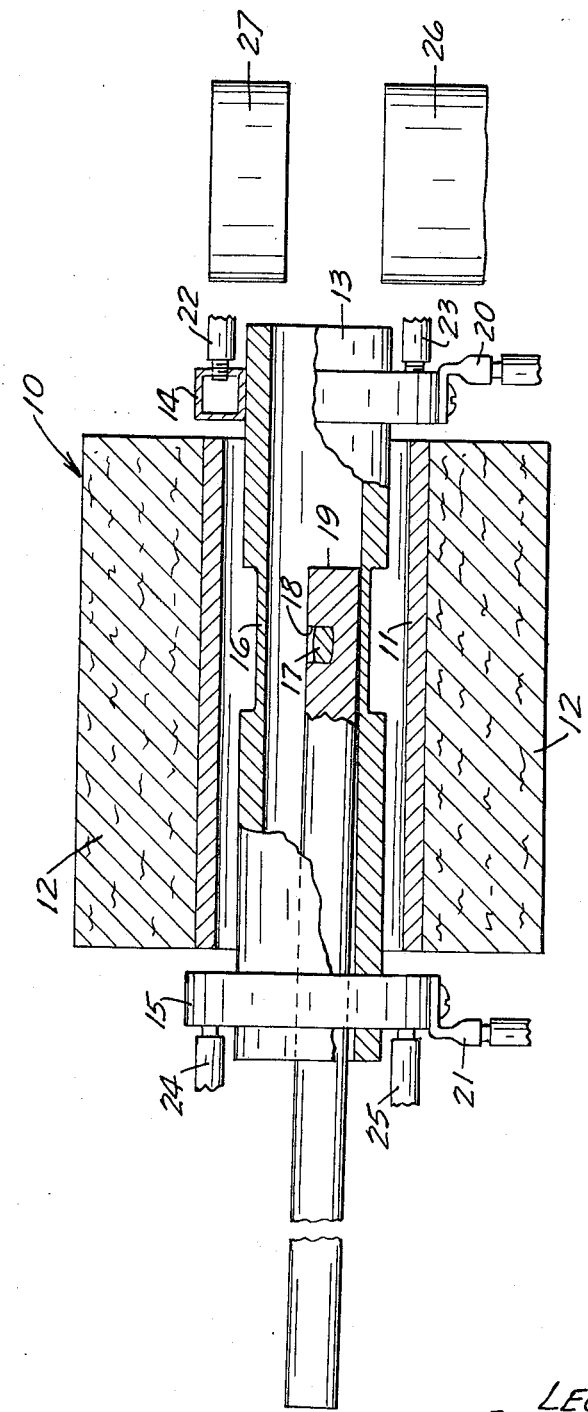

3,348,917
GLASS CONTAINING DISSOLVED CARBON, METHODS OF MAKING AND USING, AND OBTAINING GRAPHITE
Leonard R. Nestor, St. Paul, Minn., assignor to Minnesota Mining and Manufacturing Company, St. Paul, Minn., a corporation of Delaware
Filed July 22, 1960, Ser. No. 44,818
11 Claims. (Cl. 23—209.1)

This invention relates to the preparation of inorganic non-metallic solid solutions of carbon, and products derived therefrom.

The invention provides transparent clear or amber-colored glass compositions which when properly thermally treated are converted to a glossy black, thus providing means for the estimation of thermal histories. The electrical resistance of the glass material is simultaneously controllably reduced, making possible the provision of electrical circuit components. The black appearance is caused by precipitation of carbon in the form of graphite, which when subsequently removed by suitable treatment leaves a residual microporous structure useful, for example, as a catalyst or catalyst support. When suitably precipitated, the graphite is recoverable in the form of large flakes or clusters of a high degree of purity and capable of being compressed into various desired shapes.

Tricalcium aluminate has long been known in the form of sinter, for example in the preparation of Portland cement, but has not ordinarily been made available in the glassy state. The addition of substantial proportions of silica is known to produce compositions which are easily prepared in the form of non-crystalline glasses, but in which carbon is essentially insoluble.

It has now been found that compositions consisting essentially of tricalcium aluminate are capable, in the molten form, of dissolving relatively large amounts, e.g., up to at least about four or five percent by weight, of carbon. It has been found possible, using such compositions and operating under appropriate conditions, to produce a clear transparent colorless or amber colored glass. It has further been found that such glass has the unique characteristic of changing from the amber transparent form to an intensely black and opaque form when subsequently heated, for example in a muffle furnace at elevated temperatures will below the initial melting point, and thus of serving as a tell-tale in the investigation of thermal processing. The change in color is accompanied by the in situ deposition or precipitation of much or all of the carbon, which under appropriate conditions may then be recovered as large flakes or clusters of substantially pure graphite.

The tricalcium aluminate glass is preferably formed by melting together in a suitable furnace a mixture consisting essentially of pure aluminum oxide and calcium oxide in 1:3 molecular ratio, although other suitable sources of the required elements may equally well be employed. The ingredients may be fixed, compressed into pellets, and pre-sintered, or may be used directly in forming the carbon-containing glass. Carbon in relatively pure form, and ordinarily in considerable excess, is mixed or placed in contact with the glass-forming mixture and the entire mass is then heated in a non-oxidizing atmosphere to a temperature within the approximate range of 1620–1820° C., i.e., above the melting point of the tricalcium aluminate but below the temperature at which significant volatilization is encountered. Heating is continued until a homogeneous composition is assured, whereupon the mass is rapidly cooled by quenching. The product thus obtained is a clear transparent amber colored glass. On again heating the glass to a somewhat lower temperature, e.g., in the neighborhood of 1000° C., the product rapidly darkens, becoming coal black within a short time.

The black modification is obtained directly from the melt by slow cooling rather than quenching; and by cooling at a sufficiently low rate there may be obtained large lustrous graphite flakes, or clusters of flakes, throughout the solifiied mass. The glassy portion may then be removed by dissolving in acid, and the flakes of pure graphite recovered.

The molten mixture is electrically conductive and may if desired be heated electrically. The solidified black-colored product prepared by methods hereinbefore described is also found to be electrically conductive, the conductivity varying directly with the amount of carbon precipitated within the glass. Accordingly, the material is useful, for example in the form of small beads or particles, in the production of electrical resistor elements.

Another application for which the black graphite-containing products of the invention are particularly useful is in the forming of porous articles useful as filters or as supporting media for catalysts or for various other purposes and produced by the controlled heating of the black material under oxidizing atmosphere and at a temperature less than the melting temperature of the mass. The carbon is slowly oxidized and r moved, leaving a microporous structure which ordinarily is chalk-white in appearance.

Under normal atmospheric pressures, maximum uptake of carbon is obtained at, or very close to, the theoretical composition of tricalcium aluminate, and may go as high as about 5 percent based on the total weight of the transparent amber glass product. At higher proportions of alumina a clear transparent glass is obtained but the amount of carbon taken up by such glass is reduced as the excess of alumina is increased. With excess calcium oxide the glassy product is milky or chalky in appearance rather than clear and transparent; here again, the proportion of carbon taken up by the mixture is reduced. It is therefore desirable to hold the composition within not more than a few percent in either direction from the theoretical 1:3 molecular ratio of aluminum oxide and calcium oxide. Under high pressure conditions compositional criticality is minimized, and broader ranges of proportions may be used.

Although tricalcium aluminate itself is greatly preferred, it is nonetheless possible to substitute small amounts of other materials for the calcium oxide. For example, in place of 9 atoms of calcium there may be employed 8 atoms of calcium with one atom of sodium, with no significant change in the carbon solubility of the resulting glass.

Small amounts of other components may be included where desired for special purposes but are not essential for the dissolving of the elemental carbon. Thus, various metals have been added in small proportions without significantly reducing the amount of carbon soluble in the mixture. The resulting glass turns black on heating, and the carbon is removable by oxidation to form a microporous structure having specific catalytic properties, depending on the metal or metals selected. Selection may alternatively be based on desired color effect or for other purposes.

The clear transparent carbon-containing glass product of the present invention is conveniently prepared in apparatus as illustrated in the accompanying drawing, which shows in cross-section a carbon tube furnace 10 having an outer carbon tube 11 surrounded by heat-insulative lagging 12 of powdered carbon within an outer cover, and an inner carbon resistance tube 13 connected to a source of current through electrodes 14 and 15 and having an inner heating zone 16 of reduced wall thickness.

The charge 17 is carried within an open pocket 18 provided in a carbon rod 19 suspended within the inner tube 13, and at the central heating zone. The electrodes 14, 15 are connected through leads 20, 21 to a suitable source of current, and are themselves cooled by water passing through tubes 22, 23, 24 and 25.

The rod 19 extends sufficiently beyond the rear end of the tube 13 to permit the forward end of the rod to be pushed past the front end of the tube for releasing and quenching the sample, as on the massive copper anvil 26. Twisting the rod 19 permits the charge 17 to drop from the pocket 18 onto the flat face of the anvil 26. The rod 19 is then immediately drawn back into the tube 13, and the massive copper hammer 27 is immediately lowered onto the charge on the anvil. The mass of the copper hammer and anvil, and the effective contact obtained between these members and the layer of glass therebetween, provides for substantially instantaneous cooling or quenching of the glass, which under these conditions is obtained in clear transparent form.

In a typical apparatus as thus described, the carbon rod 19 is 1 inch in diameter, and the pocket 18 is ¾ inch in diameter and approximately ¾ inch deep; the tube 13 has an internal diameter of 2 inches; and the outer tube 11 has an internal diameter of 4 inches. The electrical current provided is sufficient to cause the desired degree of heating at the central reduced thickness area of the tube 13, the latter being of sufficient thickness at the central area to provide the required mechanical strength and being of sufficiently greater thickness over the remaining areas to avoid excessive heating thereat.

Quenching has been conveniently accomplished between two massive copper plates having flat mating surfaces approximately 5 inches square, as indicated in the drawing, but has also been accomplished by submerging the molten charge in fluid quenching media including, for example, glycerine, mercury, or Wood's metal or other low-melting metal alloy held at a temperature slightly above its melting point. In the last-named instances the charge is substantially lower in density than the metal, but is easily and quickly submerged by means of an inverted wire basket attached to a suitable thrust rod.

It will be appreciated that larger quantities of materials and products may be handled in apparatus of greatly increased capacity and of specifically different construction but meeting essentially the same requirements as here involved. Continuous fusion and fining under a reducing atmosphere, with continuous quenching of the product between cooled metal rollers or in a liquid bath, comprises one such system of operation which is preferred over the batch process where larger quantities of a given product are desired.

The condition in which the carbon is held within the molten glass, or in the clear transparent colorless or amber solid modification, is not known with certainty. Thus the carbon may be in true solution, or in extremely fine colloidal subdivision, or in the form of soluble compounds, or in some other form. In any event, the carbon is present in a form in which it is invisible and from which it may be precipitated or deposited, under the conditions hereinbefore given, as uniformly distributed flakes of graphite; and hence the term "solution" or the like as herein employed is believed appropriate. In contrast to known metal solvents for carbon, such for example as metallic iron, the glassy materials here employed are non-metals.

The following specific examples, in which all proportions are given in parts by weight unless otherwise specified, will serve further to illustrate but not to limit the invention.

*Example 1*

Approximately 14 grams of a mixture of 11.1 parts of calcium carbonate and 3.8 parts of aluminum oxide was placed in the pocket of the carbon rod 19 which was then inserted within the heating tube 13 of the furnace 10, previously heated to a temperature of about 1735° C. (3150° F. as measured with an optical pyrometer). The rod reached the same temperature within 2–3 minutes and was maintained at that temperature for approximately 45 minutes. The charge, at that point in the form of a substantially homogeneous liquid mass, was then rapidly dumped onto the anvil 26 and quenched as above described. A thin flat section of clear transparent amber colored glass was obtained. When heated in a muffle furnace for several hours at about 700–800° C., the glass slowly darkened, first to a dark brown color and then to a coal black and fully opaque appearance.

*Example 2*

A mixture of 6.2 grams of calcium oxide and 3.8 grams of aluminum oxide was heated for 45 minutes at 3150° F. in the furnace, and quenched on the metal anvil as described in connection with Example 1. The resulting clear transparent amber glass was re-heated in the muffle furnace to about 1000° C., at which temperature the piece was converted to a coal black opaque mass within less than one hour.

*Example 3*

A number of compressed pellets totaling approximately 200 grams and formed from a mixture of 62 parts by weight of calcium oxide, 38 parts of aluminum oxide and 10 parts of crushed carbon obtained from a carbon electrode, was heated in a carbon boat within the carbon tube furnace for about one hour at 3150° F., and the mass was then allowed to cool slowly in the furnace. The product consisted of a tricalcium aluminate mass containing clusters of large flakes of substantially pure graphite, the flakes being several millimeters in diameter. The product was digested with dilute hydrochloric acid to dissolve the magma, the clusters of graphite flakes being recovered without any substantial disintegration. The graphite was thoroughly washed and dried, and was compressed into hard and strong flat discs and other desired shapes under high hydraulic pressure.

*Example 4*

Blocky segments of the black opaque body prepared in Example 2 and of approximately ⅜ inch mesh size were heated in a muffle furnace in air and at a temperature of about 1000° C. for about 16 hours. The body was converted to a chalk-white opaque appearance and was found on microscopic examination to be full of extremely minute pores or voids. The particles are useful as supports for catalysts, for which purpose they may be impregnated with suitable salts or other catalytic materials, and fried if necessary.

*Example 5*

The clear transparent but amber colored glass obtained in Examples 1 and 2 is effectively converted to a completely colorless modification by further heating under high pressure. In one typical procedure, the apparatus consisted of a pressure cylinder made of tungsten carbide, having a straight central bore open at both ends, the cylinder being surrounded by a cooling jacket for the circulation of cooling water. The bore was lined with a thin continuous insulating sheet of mica, within which were fitted two tungsten carbine cylindrical plungers for imparting pressure to the charge held therebetween. The charge consisted of an external cylindrical graphite heating element having a wall thickness of about 1/32 inch and surrounding a pyrophyllite cylinder ⅝ inch in length and ½ inch outside diameter, provided with a central channel having a diameter of 3/32 inch and filled with the crushed amber glass. The apparatus was placed in a hydraulic press and operated under a presure of 100,000–200,000 pounds per square inch. A source of electrical current was attached to the two plungers and the current flow was suitably controlled to provide the desired heating effect. Temperature was measured by including within the charge area isolated portions of various metals, and subsequently determining which of said metals were melted. Operating the apparatus as described at a pressure of 100,000 pounds per square inch and at a temperature above the melting point of silver but below the melting point of copper, and with no attempt to quench the glassy product other than by the cooling provided by the exterior water jacket, there was obtained, within concentric surrounding black crystalline rings, a clear transparent and completely colorless central glass core which, when subsequently heated for about one hour at about 1000° C., became coal black in appearance, thus proving the presence of significant proportions of carbon in the colorless material.

*Example 6*

A series of runs was made in the apparatus as described in connection with the drawing, but employing a bath of Wood's metal at about 90–100° C. for quenching the glassy product. Each charge consisted of about 14 grams of a mixture of 71 parts of calcium oxide (CaO), 47 parts of aluminum oxide ($Al_2O_3$) and 1.8 grams of graphite chips obtained from the graphite rod 19 employed in the furnace. The separate charges were held for 45 minutes at different temperatures, and the resulting amber glass product was analyzed for percent carbon by ignition at a high temperature in a stream of oxygen and gravimetric determination of the amount of carbon dioxide produced. The following results were obtained:

| Temperature of firing: | Percent carbon |
|---|---|
| 2950° F. (1621° C.) | 1.53 |
| 3050° F. (1677° C.) | 1.77 |
| 3150° F. (1733° C.) | 2.35 |
| 3250° F. (1788° C.) | 3.76 |
| 3300° F. (1815° C.) | 3.59 |

*Example 7*

Calcium oxide and aluminum oxide were mixed together in proportions 5 $CaO \cdot Al_2O_3$, and a series of charges of the mixture with added small amounts of graphite were heated in the furnace for 45 minutes and quenched in Wood's metal as described under Example 6. The results of carbon analyses on the transparent amber glass products were as follows:

| Temperature: | Percent carbon |
|---|---|
| 2730° F. (1499° C.) | 0.13 |
| 2850° F. (1566° C.) | .11 |
| 2950° F. (1621° C.) | .13 |
| 3050° F. (1677° C.) | .19 |

In the preceding examples it will be apparent that the amount of carbon taken up by the glass in the furnace may be greater than the amount added to the mixture as initially placed within the furnace. The additional amount is taken up from the carbon rod itself, the crushed graphite, where added, serving largely to insure early uniformity of the glass composite and the presence of non-oxidizing atmosphere at the exposed surface of the glass. Substantially the same effects are obtained when the glass charged is initially free of graphite, but with a surface layer of graphite or lamp black placed over the charge in the graphite receptacle.

*Example 8*

To mixture of calcium oxide, aluminum oxide and graphite in the approximate proportions of 62:38:1.5 there were added various metals in the amounts of ½ percent by weight, and the mixtures were placed in the furnace, melted, held at 3150° F. for 45 minutes, quenched in Wood's metal, and examined. The following metals provided glasses having the indicated color. In all cases the initially transparent colored glass became coal black on brief heating at 1000° C.

| Metal added: | Color of glass |
|---|---|
| Copper | Orange red |
| Cabolt | Ruby red |
| Nickel | Deep red |

*Example 9*

A sample of tricalcium aluminate glass containing approximately 3 percent carbon was prepared from a mixture of calcium oxide, aluminum oxide and graphite by heating in the furnace at 3150° F. for 45 minutes and the permitting the mass to cool in the furnace, producing a coal black body which was then crushed and screened. A portion of the material passing through an 80-mesh screen was used to fill a ceramic tube ⅛ inch inside diameter and 1⅝ inch in length, the particles being compacted by tapping. The resistance of the column of particles was measured and was found to be 700 ohms.

*Example 10*

To mixtures of calcium oxide and aluminum oxide in the proportions required for the formation of tricalcium aluminate there were added small proportions of silica; the mixtures, with graphite added, were heated in the furnace at 3150° F. for 45 minutes and were quenched in Wood's metal, and the resulting clear transparent glasses were examined for percent carbon. At 0.5 percent $SiO_2$ the product had a light amber color and carbon content was 1.37 percent. Increasing the silica content to 6.9 percent was found to reduce the carbon content of the resulting essentially colorless glass to 0.78 percent, and the glass converted on further heating to a dark brownish black rather than a coal black appearance.

*Example 11*

Mixtures of 56 percent by weight of calcium oxide and 44 percent of aluminum oxide, together with small amounts of graphite, were heated at 3150° F. in the furnace for differing times and quenched in Wood's metal, and the amount of carbon in the clear transparent glassy product was determined by analysis. At 45 minutes the carbon content was .83 percent. At 75 minutes the carbon content was increased to 1.33 percent.

The foregoing specific examples will be understood to be illustrative rather than limitative, since wide variations in materials, composition, time, temperature, pressure and other significant variables may obviously be routinely investigated within the scope of the invention and particularly in the light of the description herein provided. In all cases there is provided a non-metal solid solution of carbon, at a useful concentration of at least about one percent, in a transparent glass from which the carbon may be deposited or precipitated to provide a variety of useful products and processes.

What is claimed is as follows:

1. A liquid solution of elemental carbon in fused tricalcium aluminate.

2. Clear transparent glass consisting essentially of tricalcium aluminate containing about 1–4 percent carbon and characterized by conversion to intense black when heated to about 1000° C. in a non-oxidizing atmosphere.

3. An article consisting essentially of non-crystalline tricalcium aluminate containing pure carbon intimately dispersed therethrough.

4. An article of manufacture comprising a body consisting essentially of acid-soluble tricalcium aluminate containing flakes of pure graphite.

5. Method of dissolving carbon comprising heating a mass of tricalcium aluminate at an elevated temperature sufficient to impart fluidity while said mass is in intimate contact with a source of elemental carbon and is maintained under a non-oxidizing atmosphere.

6. Method of making clear transparent carbon-containing glass comprising heating together components consisting essentially of aluminum oxide and calcium oxide in approximately 1:3 molecular ratio to a temperature within the range of about 1620–1820° C. in contact with a source of elemental carbon and under a non-oxidizing atmosphere for a time sufficient to provide a liquid melt containing dissolved carbon, and then rapidly quenching said melt.

7. Method comprising holding carbon-containing tricalcium aluminate glass at an elevated temperature less than that required for liquefaction and for a time sufficient to permit the in situ precipitation of said carbon.

8. Method of making pure flake graphite comprising heating together components consisting essentially of aluminum oxide and calcium oxide in approximately 1:3 molecular ratio to a temperature of at least about 1620° C. in contact with a source of elemental carbon and under a non-oxidizing atmosphere for a time sufficient to provide a liquid melt containing at least about 3–4 percent of dissolved carbon, slowly cooling and solidifying said melt in the furnace atmosphere to permit in situ precipitation of flake graphite, and then separating said flake graphite from the surrounding acid-soluble magma.

9. Method of making a porous product comprising heating a body of tricalcium aluminate, containing in situ precipitated carbon intimately dispersed therein, in an oxidizing atmosphere for a time and at a temperature sufficient to oxidize and remove said carbon without melting said tricalcium aluminate.

10. A chalk-white minutely porous solid body of tricalcium aluminate produced in accordance with the method of claim 9.

11. Method of investigating thermal processing comprising subjecting to determinable thermal conditions a tell-tale comprising clear transparent tricalcium aluminate glass containing about 1–4 percent of dissolved carbon.

References Cited

UNITED STATES PATENTS

| | | | |
|---|---|---|---|
| 648,892 | 5/1900 | Bachmann et al. | 252—508 |
| 1,420,512 | 6/1922 | Baily | 23—209.1 |
| 1,613,238 | 1/1927 | Meyers | 106—104 |
| 1,789,197 | 1/1931 | Seailles et al. | 106—104 |
| 2,043,249 | 6/1936 | Jones et al. | 106—104 |
| 2,106,578 | 1/1938 | Schwartzwalder et al. | 252—509 X |
| 2,113,610 | 4/1938 | Bacon | 252—502 X |
| 2,322,581 | 6/1943 | Lytle | 106—40 |
| 2,407,135 | 9/1946 | Clark | 106—104 |
| 2,431,326 | 11/1947 | Heyroth | 106—44 X |
| 2,472,490 | 6/1949 | Plank | 106—40 |
| 2,699,510 | 1/1955 | Smelt | 252—508 X |
| 2,774,675 | 12/1956 | Slayter | 106—47 X |
| 2,886,476 | 5/1959 | Dumesnil | 252—502 |

FOREIGN PATENTS 797,573  7/1958  Great Britain.

OTHER REFERENCES

Mellor: "Comprehensive Treatise on Inorganic and Theoretical Chemistry," vol. V (1925), Longman Green Co. (p. 13).

Levin et al.: Phase Diagrams for Ceramists, pub. 1956, by J. Amer. Ceramic Soc., Columbus, Ohio, p. 46, FIG. 43.

HELEN M. McCARTHY, *Primary Examiner.*

JOHN R. SPECK, TOBIAS E. LEVOW, *Examiners.*